United States Patent [19]
Carter

[11] Patent Number: 5,845,121
[45] Date of Patent: Dec. 1, 1998

[54] EXPRESSION EVALUATION IN A MULTI-LANGUAGE DEBUGGER

[75] Inventor: Derek K. Carter, Morgan Hill, Calif.

[73] Assignee: International Business Machines Corporation, Armonk, N.Y.

[21] Appl. No.: 540,409

[22] Filed: Oct. 6, 1995

[51] Int. Cl.⁶ ................................. G06F 9/45
[52] U.S. Cl. ........................................ 395/704
[58] Field of Search ........................ 395/705, 704

[56] References Cited

U.S. PATENT DOCUMENTS

| | | | |
|---|---|---|---|
| 5,577,253 | 11/1996 | Blickstein | 395/705 |
| 5,613,117 | 3/1997 | Davidson et al. | 395/708 |
| 5,630,137 | 5/1997 | Carney | 395/678 |
| 5,659,753 | 8/1997 | Murphy et al. | 395/705 |

*Primary Examiner*—Emanuel Todd Voeltz
*Assistant Examiner*—John Q. Chavis
*Attorney, Agent, or Firm*—Merchant, Gould, Smith, Edell, Welter, & Schmidt

[57] ABSTRACT

A method and apparatus for evaluating expressions in a multi-language debugger. Operandi in an expression are first normalized, and then evaluation routines written in the language of the expression to be evaluated are called. A program storage device, readable by a computer having a memory, tangibly embodying a program of instruction executable by the computer, performs the steps of identifying an operand type for an expression; normalizing the operand; calling a native language routine associated with the expression to produce a result; and un-normalizing the result. Thus, the need for very complex expression evaluation routines is obviated. Further, the native language routines need handle only normalized operandi rather than every variation of each data type.

24 Claims, 5 Drawing Sheets

EXPRESSION EVALUATION IN A MULTI-LANGUAGE DEBUGGER

BACKGROUND OF THE INVENTION

1. Field of the Invention

This invention relates in general to a method and apparatus for debugging computer programs, and more particularly, to a method and apparatus for evaluating expressions in a multi-language debugger.

2. Description of Related Art

Implementing the rules of expression evaluation for a particular language in a multi-language debugger can be complex and error-prone because the debugger tries to emulate the complicated expression evaluation rules implemented by the compiler for that language.

This is especially true in a language such as COBOL wherein each data type can have various modifiers, such as JUSTIFIED, PICTURE, and SIGN LEADING/TRAILING/SEPARATE and INCLUDED clauses, and numeric types can have various forms such as BINARY, PACKED, and ZONED.

In prior systems, the whole debugger, including the expression evaluator, was normally implemented in a single language. The particular language that was implemented would be the language most appropriate for the core (non-expression evaluation) portion of the debugger. For multi-language debuggers, as new languages are added, expression evaluation for these languages were implemented in the same language as the core debugger implementation language. Thus, the complexities of expression evaluation for the language being debugged would be completely implemented in the core debugger implementation language. However, this entails virtually rewriting the compiler's expression evaluation implementation in the debugger, which proves to be difficult and prone to errors. Further, this method also carries the risk of divergence from the expression evaluation rules of the language being debugged as these rules are change and/or enhanced from version to version.

It can be seen then that there is a need for a method and apparatus for evaluating expression in a multi-language debugger.

It can also be seen then that there is a need for a method and apparatus for debugging programs that ensures compatibility with the compiler in terms of expression evaluation rules.

It can also be seen that there is a need for a method and apparatus for debugging programs that obviates the need for very complex expression evaluation routines.

SUMMARY OF THE INVENTION

To overcome the limitations in the prior art described above, and to overcome other limitations that will become apparent upon reading and understanding the present specification, the present invention discloses a method and apparatus for evaluating expressions in a multi-language debugger.

The present invention solves the above-described problems by normalizing operandi in an expression, then calling evaluation routines written in the language of the expression to be evaluated. Because these routines are written in the language of the expression to be evaluated, the aforementioned complexity is relegated to the compiler and compatibility with the compiler in terms of expression evaluation rules is ensured.

A system in accordance with the principles of the present invention comprises a program storage device, readable by a computer having a memory, tangibly embodying a program of instruction executable by the computer to perform the steps of identifying a type for an operand in an expression, normalizing the operand, calling a native language routine associated with the expression to produce a result, and un-normalizing the result obtained from the native language routine.

One aspect of the present invention is that the need for very complex expression evaluation routines is obviated.

Another aspect of the present invention is that the routine need handle only normalized operandi rather than every variation of each data type.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

OVERVIEW

The present invention discloses a method, apparatus, and program product for evaluating expressions in a multi-language debugger. The present invention is particularly suited for evaluating expressions for inter-language communications across routines. More specifically, the invention provides for the normalization of operandi in an expression, and then calling an evaluation routine written in the language of the expression to be evaluated. Since the evaluation routine is written in the language of the expression to be evaluated, complexity is relegated to the compiler and compatibility with the compiler in terms of expression evaluation rules is ensured. Normalization of the operandi(i) and calling the native language evaluation routine obviates the need for very complex expression evaluation routines— i.e., the routine need handle only normalized operandi rather than every variation of each data type.

ENVIRONMENT

Figure 1:
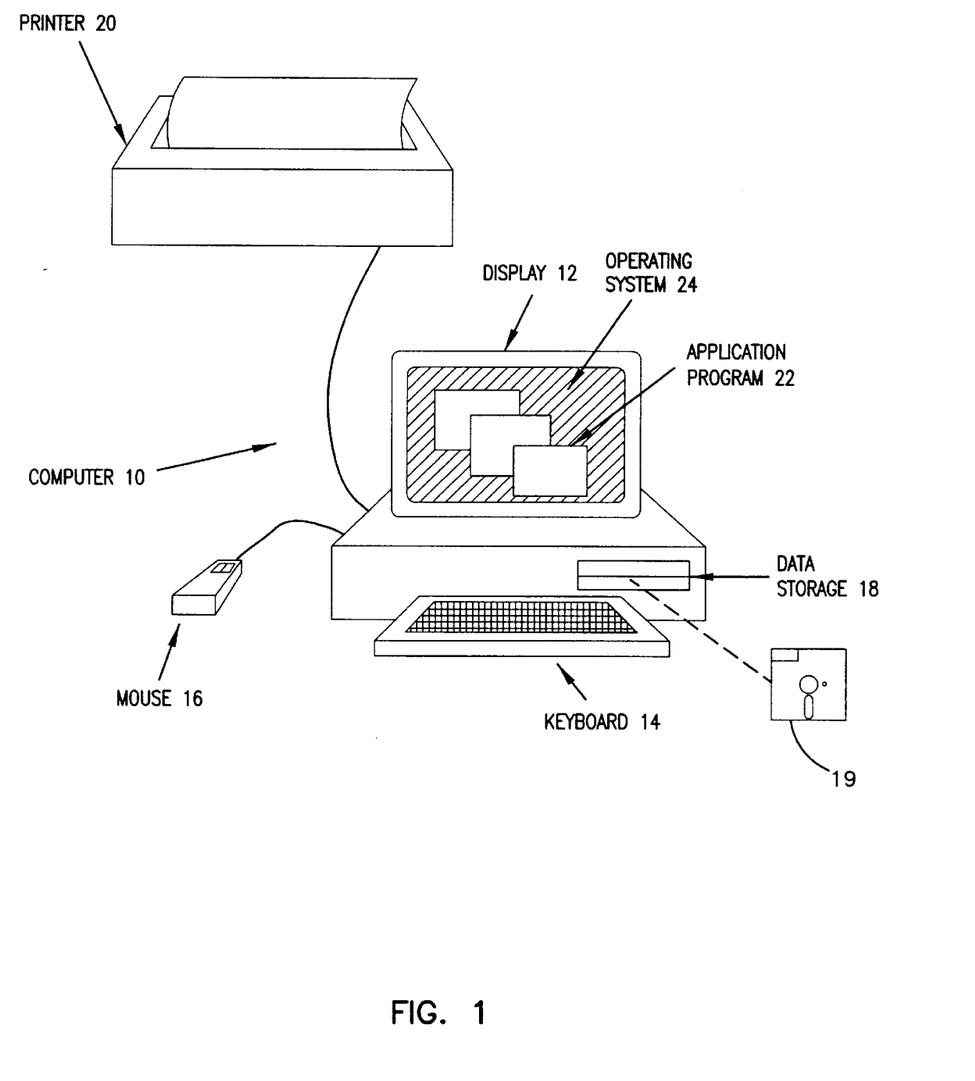
FIG. 1 is a block diagram illustrating an exemplary computer system used to implement an embodiment of the invention.

FIG. 1 is a block diagram illustrating an exemplary computer system 10 used to implement the preferred embodiment of the invention. The computer 10 may include, inter alia, a monitor or display device 12, keyboard 14, mouse or other pointing device 16, fixed 18 and/or removable program storage devices 19, and printer 20. Those skilled in the art will recognize that any number of components, peripherals, and other devices may be used with the computer system 10.

An application program 22 executing under the control of an operating system 24, such as "IBM OS/2™", "MICROSOFT WINDOWS™", "UNIX™", "DOS™", etc., is used to implement the present invention on the computer 10. Generally, the application program 22 is tangibly embodied in a computer-readable medium, e.g., one or more of the fixed 18 and/or removable program storage devices 19. The application program 22 comprises instructions which, when read and executed by the computer 10, causes the computer 10 to perform the steps necessary to implement the present invention. Under control of the operating system 24, the application program 22 may be laded from the program storage device (18 or 19) into the memory of the computer 10 for use during actual operations.

EXPRESSION EVALUATIONS

Figure 2:
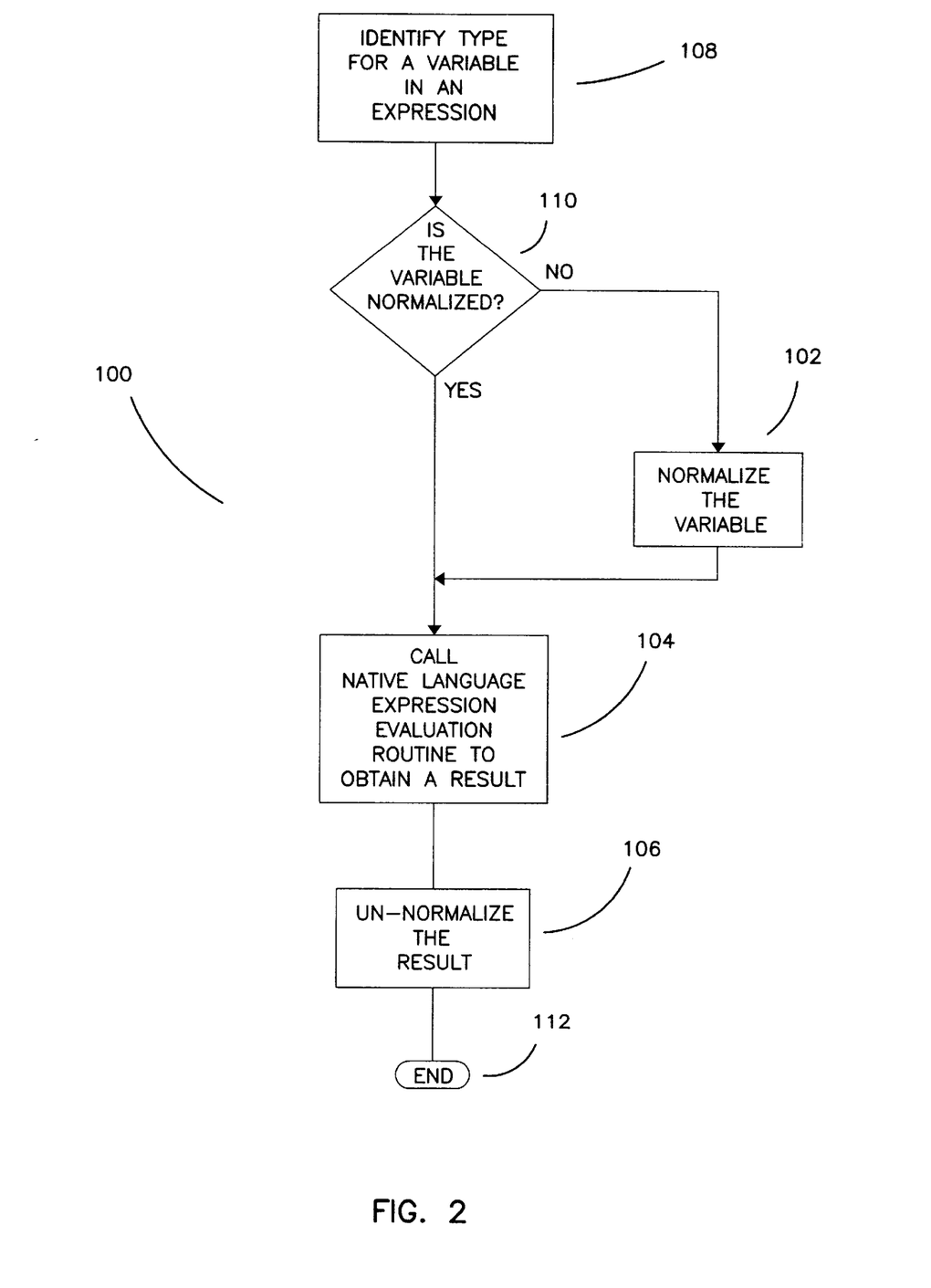
FIG. 2 is a flow chart illustrating the steps taken to evaluate expressions in a multi-language program according to the present invention.

FIG. 2 illustrates the steps 100 taken to evaluate expressions in a multi-language program according to the present invention. The process involves three main steps: normalization 102, calling a native language routine associated with the expression to produce a result 104; and un-normalization 106. However, in this exemplary process illustrated in FIG. 2, the type for a operand, which may be a variable or a constant, is first obtained 108. Then the process determines whether the operand is in normalized form 110. Normalization 102 involves the conversion to the largest variation of the particular type involved (e.g., 4 byte converted to 8 byte). If the operand has not been normalized, then the normalization process 102 is invoked. The normalization process 102 is illustrated in greater detail with reference to FIG. 3 below. Once the operand is normalized, then an evaluation routine written in the language of the expression to be evaluated is called 104.

Returning now to step 110, if the opened is in normalized form, then the evaluation routine 104 is called.

By way of example, an exemplary process for making a language-specific assignment is illustrated in more detail with reference to FIG. 4 below.

Once the evaluation operation 104 is completed, the process un-normalizes 106 the result obtained from the native language expression evaluation routine 104. In the specific case involving an assignment, the un-normalized result may be written to the debuggee memory 112. Nevertheless, the programmer does not need to know how the compiler will handle the operand.

Figure 3:
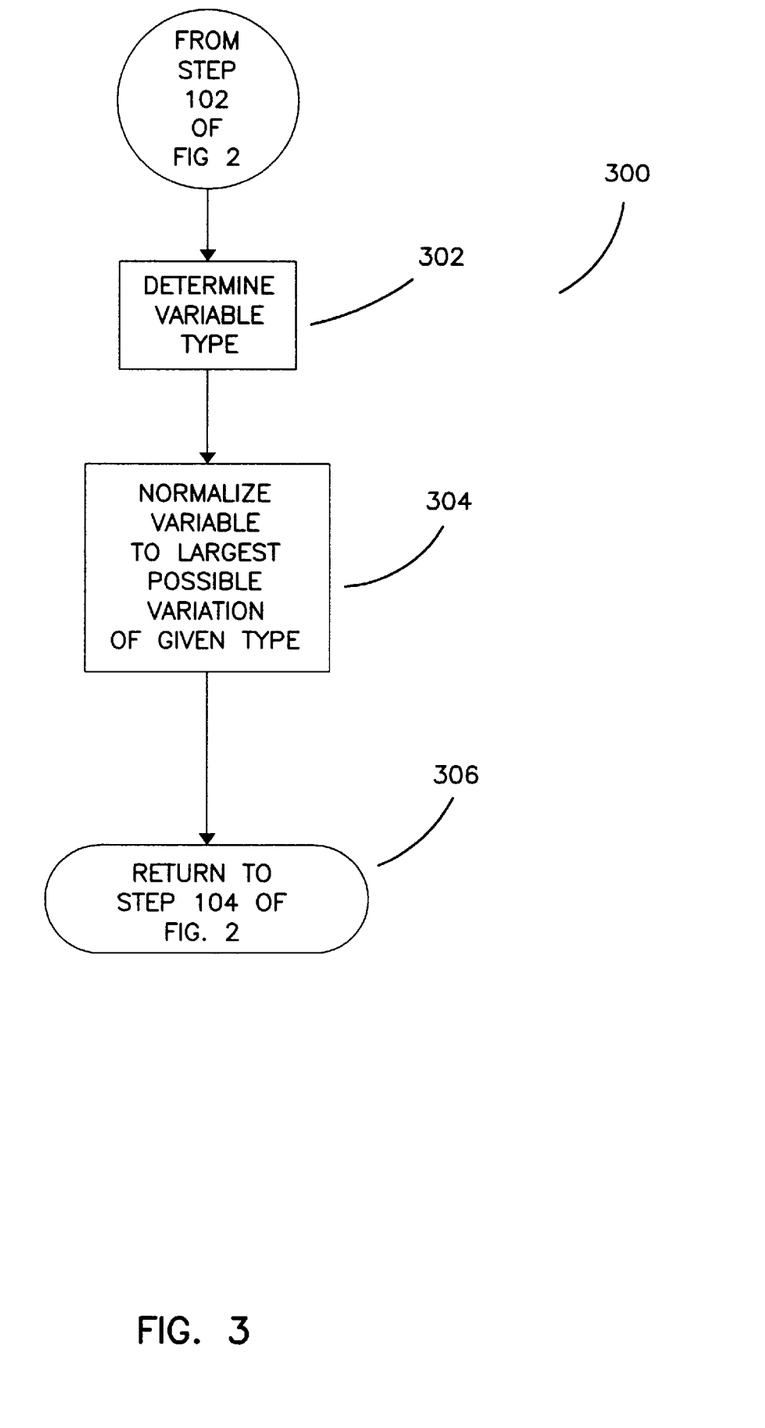
FIG. 3 is a flow chart illustrating the normalization process according to the present invention.

FIG. 3 illustrates the normalization 300 process according to the invention. First, the process determines the operand type 302. Then, the operand is normalized 304 according to its type. For example, in the case involving a language-specific assignment, if the source is binary, then the source is converted to the maximum-sized binary number while the sign information is retained. The binary number is moved to a buffer whose size is that of the largest possible supported binary number. If this is a 2 byte binary number and the largest possible binary supported is an 8-byte binary, the 2-byte binary would be moved to an 8-byte buffer.

On the otherhand, if the source is not binary, the process determines whether the source is zoned-decimal. If the source is zoned-decimal, then the source is converted to the maximum-sized zoned-decimal number while the sign information is retained. The zoned-decimal number is moved to a buffer whose size is that of the largest possible supported zoned-decimal number. If this is an 11-byte zoned-decimal and the largest possible zoned-decimal supported is an 18-byte zoned-decimal, the 11-byte zoned-decimal is moved to an 18-byte buffer while the value and sign are retained. Note that for zoned-decimal, the sign may be represented in various ways (i.e., trailing and separate, trailing and included, leading and separate, leading and included, or unsigned). A single sign representation is chosen for the normalized form. Since additional source types are possible, other normalization processes are also possible.

In any event, after the normalization step 304, the normalized operand is returned 306 to step 104 of FIG. 2 where an evaluation routine written in the language of the expression to be evaluated is called.

Figure 4:
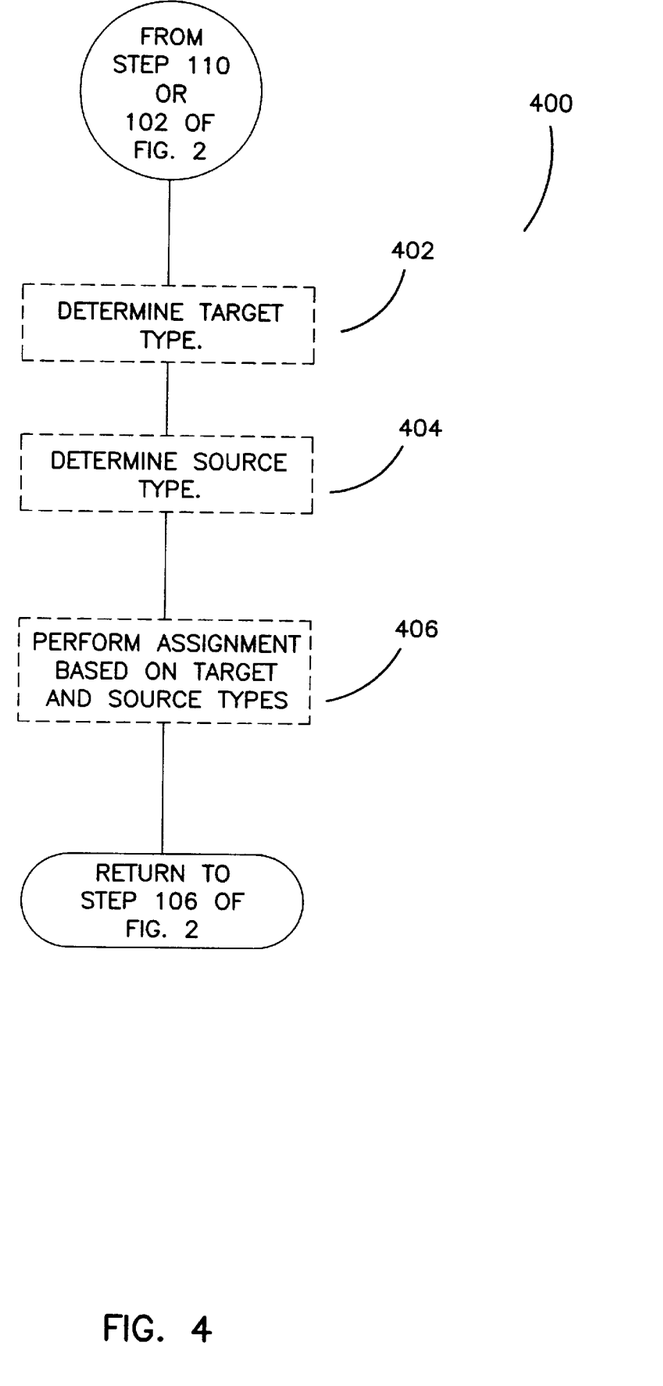
FIG. 4 is a flow chart illustrating an exemplary process for making a language-specific assignment according to the invention.

FIG. 4 illustrates an exemplary process 400 for making a language-specific assignment according to the present invention. First the data type of the target in the assignment statement is determined 402. Then the data type of the source in the assignment statement is determined 404. Then, an assignment statement is performed 406 based on the identification of the types for the target and the source. The modules for the language-specific manipulations must be written in the language of the debuggee. That is, if the program being debugged is a COBOL program this module must be written in COBOL. This fact is what relegates the complexity of the language rules (assignment, in this example) to the compiler. The compiler generates the code necessary to perform the assignment for the particular types. Thereafter, un-normalization is performed, step 106 of FIG. 2, on the returned results.

Figure 5:
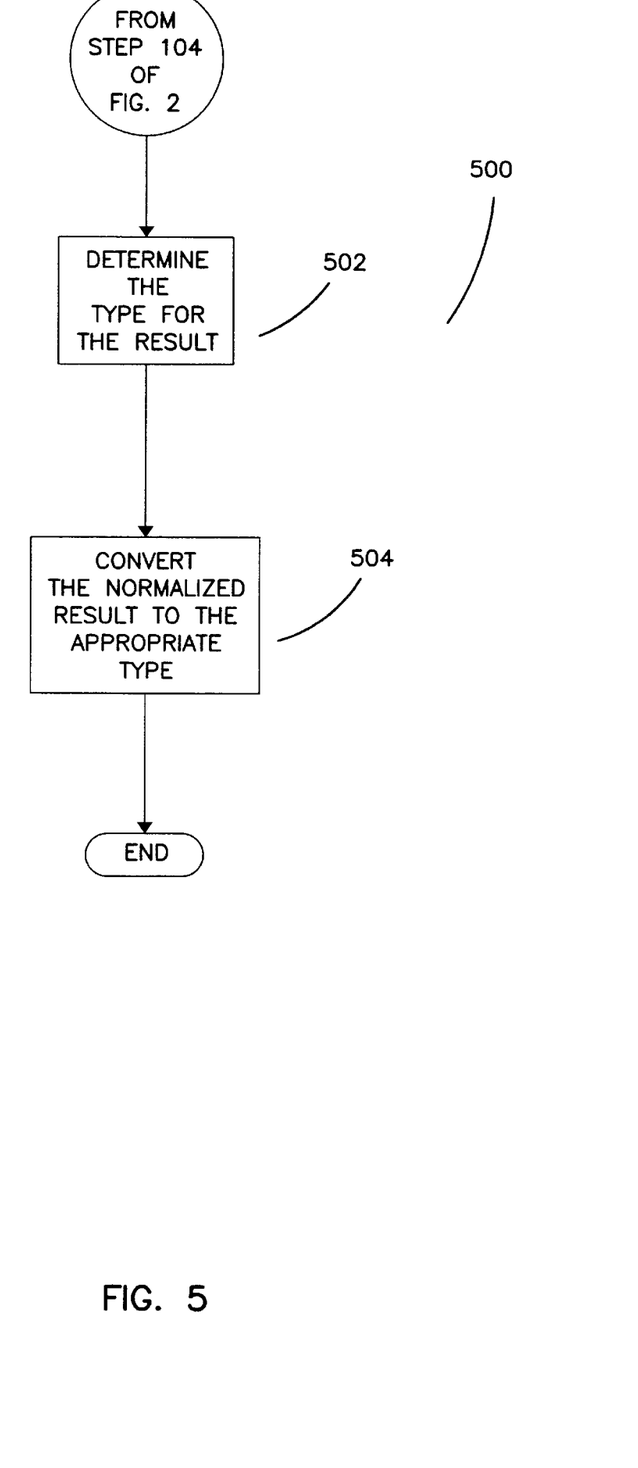
FIG. 5 is a flow chart illustrating the process for determining the target type and performing the appropriate un-normalization steps according to the present invention.

FIG. 5 illustrates the un-normalization process 500 according to the present invention. First, the maximum-sized result is analyzed to determine the appropriate type for un-normalization 502. Then, this number is converted into the identified type 504 and processing returns to step 106 of FIG. 2 to un-normalize the returned result. This process ensures that the proper type for the returned result has been identified so that the result is appropriately un-normalized.

By way of example, routines for the modification of various data types in COBOL are illustrated hereinafter. More specifically, the following routines may be provided by COBOL for updating an operand (assignment) in accordance with the invention. As an example of how complex COBOL type conversion can be, consider the fact that JUSTIFIED clause (only valid for alphanumeric and alphabetic) causes right justification on an assignment rather than the normal left, and PICTURE clause has many variations (e.g., if PIC clause is $$,999, a MOVE of 999 into it should make storage bb$999, where b is a blank). further, SIGN LEADING/TRAILING impacts internal the representation.

However, a COBOL program is written to perform the actual assignment, thereby relegating the aforementioned complexity to the compiler and assuring compatibility with the compiler. This COBOL program will consist of EVALUATE statements for the source and target values which will determine the correct assignment statement to make and perform it. Each of the assignment statements in this COBOL program will use an appropriate "template" declaration from the linkage section based on the types involved. Index names and POINTERS are updatable as well, and the SET statement is sued for this. Now the various combinations for MOVE will be considered.

1. Alphabetic Targets

For alphabetic targets, a reference-modified PIC A(max) template is used for the target, where "max"=16777215, the maximum allowable size. A similar template will be repeated with the JUSTIFIED RIGHT clause. Source categories for an alphabetic target are as follows:

Alphabetic
  A reference-modified MOVE may be made using a PIC A(max) template for the source.
Alphanumeric and Alphanumeric-Edited
  A reference-modified MOVE may be made using a PIC X(max) template for the source.

2. Alphanumeric Target

For alphanumeric targets, a reference-modified PIC X(max) template may be used for the target. A similar template will be repeated with the JUSTIFIED RIGHT clause. Source categories for an alphanumeric target are as follows:

Alphabetic
  A reference-modified MOVE may be made using a PIC A(max) template for the source.
Alphanumeric, Alphanumeric-Edited, and Numeric-Edited
  A reference-modified MOVE may be made using a PIC X(max) template for the source.
Numeric Integer
  The same templates used for numeric target may be used for numeric integer source (see Numeric Target section).

3. Alphanumeric-Edited Target

For alphanumeric-edited targets, a reference-modified PIC X(max) template may be used for the target. Source categories for an alphanumeric target:

Alphabetic
  A reference-modified MOVE may be made using a PIC A(max) template for the source.
Alphanumeric, Alphanumeric Edited, Numeric Integer, and Numeric-Edited
  A reference-modified MOVE may be using a PIC X(max) template for the source.

The justification for handling an alphanumeric-edited target is as follows. Given the declaration "77 testANE PIC X(10)/XX", a "MOVE 'UVWXYZ' TO testANE" yields the edited result of "UVWXYZ/" and "MOVE 'ALPHANUMER01' TO testANE" yields the edited result of "ALPHANUMER/01". However, when modifying alphanumeric-edited data, overwrite mode is recommended so that characters will be overwritten within the popup, thereby maintaining the integrity of the edit characters rather than shifting them right or left by inserting or deleting characters.

4. Numeric Target

The following series of 38 PICTURE clauses may be used as templates for the various numeric targets: V9(18), 9V9(17), 9(2)V9(16), . . . 9(18)V, and SV9(18), S9V9(17), S9(2)V9(16), . . . S9(18). The 38 PICTURE clauses above will be repeated with a USAGE is BINARY clause, then again with a USAGE IS PACKED-DECIMAL clause. Note that the actual target should not be passed to this COBOL assignment program, but rather a temporary buffer big enough to hold the largest possible number in each usage category. Also, the total number of MOVE statements necessary in the COBOL program can be dramatically reduced by adding some intelligence beyond the MOVEs. For example, none of the signed PIC templates would be needed if everything were treated as unsigned, then adjusted appropriately.

The following special cases apply to each USAGE category. In all cases, an overflow situation, should be checked for upon returning from the assignment program. For USAGE IS DISPLAY (default), the temporary buffer size should be 19 bytes. Upon returning from the call to this assignment program, the right-most n bytes will be moved into the actual target, where n is the size of the target. This will ensure no unintentional storage overlays. In addition, the information from the sign byte must be moved into the actual target from the temporary buffer.

The 19 signed versions of the PICTURE clause templates above could be repeated 3 times: once for SIGN IS LEADING SEPARATE, again for SIGN IS TRAILING SEPARATE, and finally for SIGN IS LEADING. Nevertheless, this sign variation should be handled outside of the MOVE logic in order to avoid an unnecessary proliferation of MOVEs. Note that the SIGN clause is only valid for USAGE IS DISPLAY items.

For USAGE IS BINARY, the temporary buffer size should be 8 bytes. Upon returning from the call to the assignment routine, the right-most n bytes will be moved into the actual target, where n is 2 if there are 1 through 4 digits in the PICTURE clause, 4 if there are 5 through 9 digits in the PICTURE clause, and 8 if there are 10 through 18 digits in the PICTURE clause.

Finally, for USAGE IS PACKED-DECIMAL, the temporary buffer size should be 10 bytes. Upon returning from the call to this assignment program, the right-most n bytes will then be moved into the actual target. Source categories for a numeric target are as follows:

Alphanumeric
  A reference-modified MOVE may be made using a PIC X(max) template for the source.
Numeric
  Template selection may be identical to that for a numeric target.
Numeric-Edited
  A reference-modified MOVE may be made using a PIC X(max) template for the source.
Internal Floating-point
  USAGE IS COMP-1 and USAGE IS COMP-2 may be used as templates for the source.
External Floating-point
  This should be converted to internal floating point first. To do otherwise would result in an unwieldly proliferation of templates and MOVE combinations.

5. Numeric Edited Target

For numeric edited targets, a reference-modified PIC X(max) template may be used for the target. See the discussion with respect to alphanumeric-edited targets above, since numeric edited target may be handled similarly. Source categories for a numeric-edited target are as follows:

Alphanumeric, Numeric, Numeric-Edited, and Floating-point
  A reference-modified MOVE may be made using a PIC X(max) template for the source.

6. External Floating-point Target

For external floating-point targets, the MOVE may be made with an internal floating point target and the result may be converted to external floating point. See the discussion above with respect to internal floating-point targets for details, i.e., the valid source categories are the same for internal and external floating point.

7. Internal Floating-point Target

For internal floating-point targets, USAGE IS COMP-1 and USAGE IS COMP-2 may be used as templates for the target. Source categories for an internal floating-point target are as follows:

Alphanumeric
A reference-modified MOVE may be made using a PIC X(max) template for the source.

Numeric
The same templates used for numeric target may be used for numeric source (see Numeric Target section).

Numeric-Edited
As with other edited classes, it's "user beware" on this one. A reference-modified MOVE may be made using a PIC X(max) template for the source.

Internal Floating-point
USAGE IS COMP-1 and USAGE IS COMP-2 may be used as templates for the source.

External Floating-point
This should be converted to internal floating point first. To do otherwise would result in an unwieldly proliferation of templates and MOVE combinations.

8. DBCS Target

For a DBCS target, a reference-modified PIC N(max) template may be used for both the target and the source (only a DBCS source is allowed with a DBCS target).

SUMMARY

In summary, the present invention provides for the evaluation of expressions in a multi-language debugger. The present invention normalizes operandi in an expression, and then calls evaluation routines written in the language of the expression to be evaluated. Complexity is relegated to the compiler and compatibility with the compiler in terms of expression evaluation rules is ensured since the evaluation routines are written in the language of the expression to be evaluated.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for evaluating expressions in a multi-language program, comprising the steps of:

identifying a type for an operand in an expression;

normalizing the operand;

calling a native language routine associated with the expression to produce a result; and un-normalizing the result obtained from the native language routine.

2. The method of claim 1 wherein the operand is a variable.

3. The method of claim 1 wherein the normalization of the operand comprises converting the operand to a maximum-sized representation.

4. The method of claim 3 wherein information representing the sign for the operand is retained.

5. The method of claim 1 wherein the un-normalizing of the result obtained from the native language routine comprises the steps of determining the target type and converting the target to the type of the operand.

6. The method of claim 1 further comprising the step of writing the new target to memory.

7. The method of claim 1 wherein the evaluation of the expression comprises the steps of determining the data type of the target, and determining the data type of the operand.

8. The method of claim 1 further comprising the step of assigning the un-normalized result to memory.

9. A computer programming apparatus for evaluating expressions in a multi-language program, comprising:

a computer, including a user interface and a display device;

means for identifying a type for an operand in an expression;

means for normalizing the operand;

means for evaluating the expression, the evaluation means routine being written in the language of the expression to be evaluated;

means for performing the expression to obtain a result; and means for un-normalizing the result.

10. The computer programming apparatus of claim 9 wherein the operand is a variable.

11. The computer programming apparatus of claim 9 wherein the means for normalizing the source further comprises means for converting the operand to a maximum-sized representation.

12. The computer programming apparatus of claim 11 further comprising means for retaining the sign for the operand.

13. The computer programming apparatus of claim 9 wherein the means for un-normalizing the result further comprises means for determining the result type and means for converting the result to the type of the operand.

14. The computer programming apparatus of claim 9 further comprising a memory, the un-normalized result being written to memory.

15. The computer programming apparatus of claim 9 wherein the means for evaluating the expression further comprises means for determining the data type of a target expression, and means for determining the data type of a source expression.

16. The computer programming apparatus of claim 9 wherein the means for performing the expression is based on the identification of the type for the operand.

17. A program storage device, readable by a computer having a memory, tangibly embodying a program of instruction executable by the computer to perform the steps of:

identifying a type for an operand in an expression;

normalizing the operand;

calling a native language routine associated with the expression to produce a result; and un-normalizing the result obtained from the native language routine.

18. The program storage device of claim 17 wherein the operand is a variable.

19. The program storage device of claim 17 wherein the normalization of the operand comprises converting the operand to a maximum-sized representation.

20. The program storage device of claim 19 wherein information representing the sign for the operand is retained.

21. The program storage device of claim 17 wherein the un-normalizing of the result obtained from the native language routine comprises the steps of determining the target type and converting the target to the type of other operand.

22. The program storage device of claim 17 further comprising the step of writing the new target to memory.

23. The program storage device of claim 17 wherein the evaluation of the expression comprises the steps of determining the data type of the target, and determining the data type of the operand.

24. The program storage device of claim 17 further comprising the step of assigning the un-normalized result to memory.

* * * * *

UNITED STATES PATENT AND TRADEMARK OFFICE
CERTIFICATE OF CORRECTION

PATENT NO. : 5,845,121

DATED : December 1, 1998

INVENTOR(S) : Derek K. Carter

It is certified that error appears in the above-identified patent and that said Letters Patent is hereby corrected as shown below:

Column 3, line 1, "operandi(i)" should read --operand(i)--.

Column 3, line 28, "laded" should read --loaded--.

Column 3, line 51, "opened" should read --operand--.

Signed and Sealed this

Twenty-eighth Day of November, 2000

*Attest:*

*Attesting Officer*

Q. TODD DICKINSON

*Director of Patents and Trademarks*